Jan. 12, 1943.  C. C. FUERST  2,308,002
PHOTOGRAPHIC SHUTTER
Filed Dec. 3, 1941
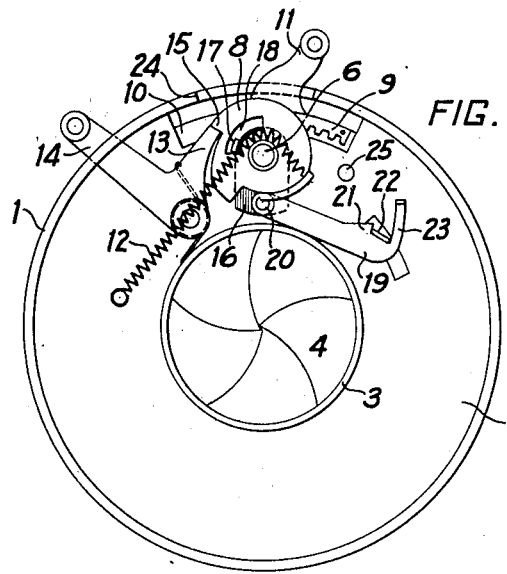
FIG. 1.
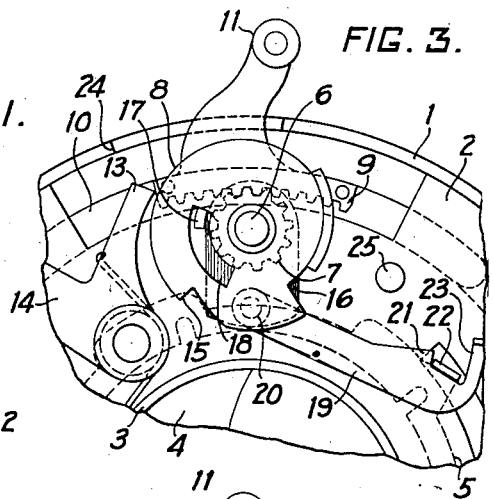
FIG. 3.
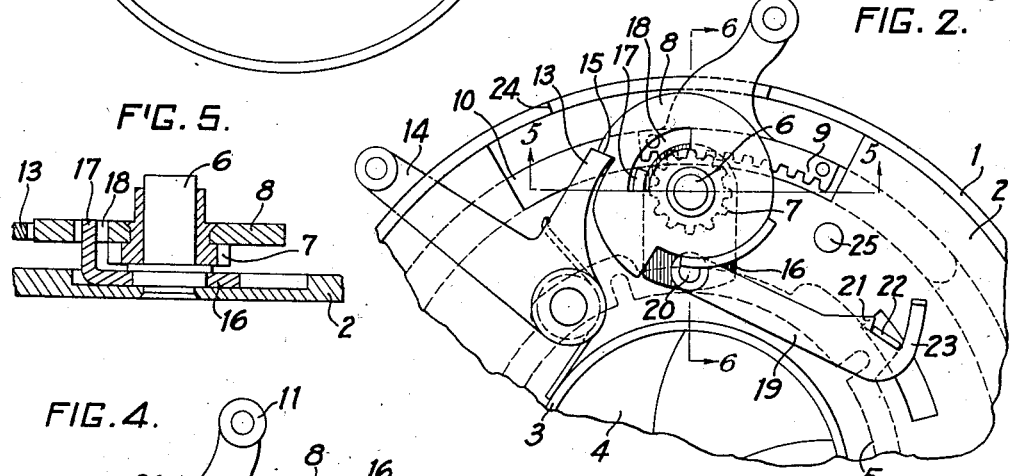
FIG. 5.
FIG. 2.
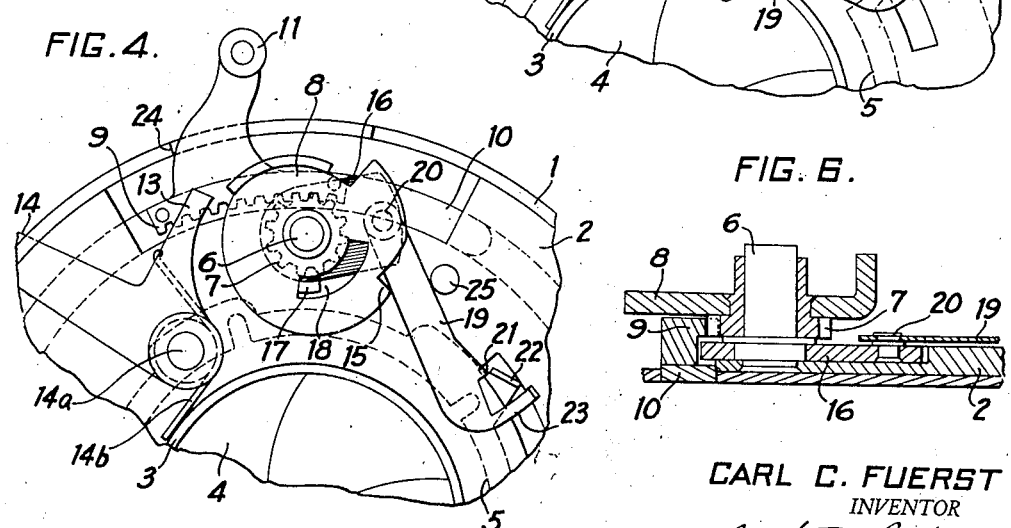
FIG. 4.
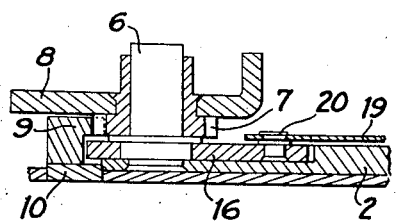
FIG. 6.
CARL C. FUERST
INVENTOR
BY
ATTORNEYS Patented Jan. 12, 1943

2,308,002

UNITED STATES PATENT OFFICE 2,308,002

PHOTOGRAPHIC SHUTTER

Carl C. Fuerst, Rochester, N. Y., assignor to Eastman Kodak Company, Rochester, N. Y., a corporation of New Jersey Application December 3, 1941, Serial No. 421,463

4 Claims. (Cl. 95—63)

This application relates to photography and more particularly to shutters of the between-the-lens type used on photographic cameras. One object of my invention is to provide a camera shutter with a mechanism capable of obtaining high speed exposures. Another object of my invention is to provide a shutter mechanism in which the master member is divided into two parts, one of which may start in advance of the other so as to gain momentum before the second part is operated so that the second part will be operated with extreme rapidity. Another object of my invention is to provide a shutter mechanism which may be placed in standard types of shutters to increase the speed of the operation thereof. Other objects will appear from the following specification, the novel features being particularly pointed out in the claims at the end thereof.

Coming now to the drawing wherein like reference characters denote like parts throughout:

Fig. 1 is a front plan view of a shutter with the shutter cover removed showing a preferred form of my invention;

Fig. 2 is an enlarged fragmentary view similar to Fig. 1 with the shutter parts shown in a set position;

Fig. 3 is a view similar to Fig. 2 but with the parts shown at the beginning of their exposure making movement;

Fig. 4 is a view similar to Fig. 3 but with the shutter parts shown in the position they assume just as the exposure has been completed;

Fig. 5 is a fragmentary sectional view taken on line 5—5 of Fig. 2; and

Fig. 6 is an enlarged fragmentary view taken on line 6—6 of Fig. 2.

With shutters of the between-the-lens type, it has been customary to operate shutter blades through a master member—that is through a member which may rotate or slide—which engages and operates the shutter blades through suitable mechanism. It has been customary to provide such mechanism so that it is operated as the master member either starts to move or just after it starts, but with most shutters of known types it is difficult to get the master member up to its maximum speed by the time the blades are starting to open and, consequently, the time for opening the blades is longer than is desirable. This is true even though the better shutters now on the market may open in (.001) one-thousandth to (.0015) one and one-half thousandths of a second. While such a speed of opening of the shutter blades is quite efficient when slow exposures are used, when faster exposures such as $1/200$ to $1/400$ of a second are used the efficiency is considerably less, and if a material part of the time now used for opening the shutter blades can be eliminated the efficiency of the shutter will be correspondingly increased. With my improved form of master member I have very materially cut down the time of opening of the shutter blades and likewise the time of closing of the blades during the fastest exposure. The time for closing the blades for the slow exposures is not materially changed because the master member is made to pause through suitable mechanism during the period when the shutter blades are fully opened.

Coming now to my invention, I wish to point out that the drawing shows only such shutter parts as are necessary for a complete understanding of my present invention, the delayed action mechanism as well as the time-and-bulb mechanism all being omitted. The standard types of such mechanisms may be used and this embodiment of my invention is an improvement over a shutter now on the market which is shown in Patent No. 2,099,866, Riddell, November 23, 1937.

In accordance with my improvement in shutter construction, the shutter may include the usual rimmed casing 1 with a mechanism plate 2 therein, this plate having a central aperture 3 through which light rays pass in making an exposure. A plurality of shutter blades 4 are movably mounted in the casing and normally closes the opening 3, these shutter blades being swung from the closed position in Fig. 1 to an open position in which they clear the aperture 3 and thence back to the closed position in making an exposure.

The shutter blades 4 may be operated by a blade ring 5 in the usual manner by a mechanism which will be later described.

The master member may be mounted upon a stud 6 which is supported by the shutter plate 2. A pinion 7 is carried by a portion of the master member which I shall call hereafter the first member 8. In the present instance, I divide my master member into two parts of which the disc 8 is one. This disc carries the pinion 7 and this pinion meshes with a rack 9, the rack in turn being carried by an arcuate shoe 10 slidably mounted on the shutter plate 2 and being movable manually by a lever 11 which extends through the shutter casing.

A coiled spring 12 has one end attached to the shutter plate 2 on the opposite end, is passed about the stud 6 and is attached to the first drive member, always tending to turn it in a driving direction which, in the present embodiment of my invention, is in a counter-clockwise direction. A trigger 14 pivotally mounted on a stud 14a in the casing is normally turned by a spring 14b toward the first drive member so that the latch element 13 may engage the latch element 15 to hold the first drive member in the set position shown in Fig. 1. Thus, when the setting lever 11 is moved in a clockwise direction, the first master member drive element is turned in a like direction until the latch elements 13—15 engage.

The second drive member is the member 16 which is also pivotally mounted on the stud 6 to turn freely thereon. This member includes an upstanding lug 17 which may project into a slot 18 cut in the first drive member so that there is a lost motion connection between these two members.

The shutter blades 4 may be operated by a latch 19 which is pivotally attached to a stud 20 carried by the second drive member 16 and which is equipped with a known type of hook formed by the projections 21 and 23 on the end of the latch member which engage a blade ring lug 22. Thus, when the second drive member 16 moves from the Fig. 2 position to the Fig. 4 position, it has rocked the lug 22 back and forth a distance sufficient to open the shutter blades 4 and close them again, thus making an exposure.

At the end of the driving movement as indicated in Fig. 4, the latch 19 strikes a pin 25, thus releasing the blade ring lug 22 so that the shutter may be set without moving the shutter blades open and closed. This construction is known and is also described in the Riddell patent above referred to.

The operation of the shutter is comparatively simple and at the same time is extremely rapid. With the parts of the shutter in the position shown in Fig. 4 which they assume after an exposure has been made, an operator swings the lever 11 in a clockwise direction from the position in which the lever 11 engages the edge 24 of the shutter flange through which this lever projects to the position shown in Fig. 1. During the first part of this movement, the first drive member 8 will move idly until the end of slot 18 engages the upstanding lug 17 on the second drive member 16. At that time the first and second drive members will move together until the position in Fig. 2 is reached in which the latch member 19 will have engaged the lug 22 and in which the trigger 14 through the action of the spring 14b will have moved the latch element 13 into engagement with the latch element 15. Thus, the parts are positioned as indicated in Figs. 1 and 2 in the set or tensioned position in which the shutter is ready for an exposure.

To make an exposure the shutter trigger 14 is pressed against the torque of spring 14b, disengaging latch element 13 from latch element 15. The power spring 12 will then cause the first drive member 8 to rotate rapidly about the stud 6 overcoming the inertia of the setting lever 11, the rack 9, and the pinion 7. The travel of this member in the present instance may be around 30° and when the end of the slot reaches the lug 17, as shown in Fig. 3, the first drive member 8 is moving very rapidly. It, therefore, strikes the lug 17 a sharp blow immediately moving the second drive member 16 and the two drive members move together from the point shown in Fig. 3 to the completion of the exposure shown in Fig. 4. This movement, of course, occurs with extreme rapidity and the shutter blades can be opened at least twice as fast as with the standard type of one-piece master member.

If the exposure is an extremely fast one, the blades are rocked open and closed without delay so that both the opening and the closing movements are much more rapid than with the standard type of shutter. However, if a delayed action mechanism is used for slower exposures—such mechanism being shown in the Riddell patent above mentioned—while the opening movement is extremely rapid, the closing movement will be somewhat slower due to the fact that the master member is delayed while the blades are fully opened. However, the efficiency of the high speed exposures is much greater than with the old type of mechanism and the efficiency of the slower speeds is only slightly greater than with the old type.

What I claim as new and desire to secure by Letters Patent of the United States is:

1. In a camera shutter of the type including a casing having an exposure aperture therein, a trigger mounted on the casing, shutter leaves for covering and uncovering the exposure aperture, a blade ring for operating the shutter leaves, the combination of a master member with said trigger, said master member comprising a pair of coaxially arranged drive members, means for setting a first drive member including a handle operable from the exterior of the shutter casing, a latch element on the first drive element positioned to contact with said trigger to hold said master member in a set condition, a striking surface on the first drive element, a lug on a second drive element positioned for engagement with the striking surface of the first drive element to move the latter by the former, a latch connecting the second drive element to the shutter blade ring, and means for positioning the two drive elements in setting the shutter so that movement of the trigger may release the first drive element for movement until the striking surface thereof engages and drives the lug of the second driver element to open and close the shutter leaves.

2. In a camera shutter of the type including a casing having an exposure aperture therein, a trigger mounted on the casing, shutter leaves for covering and uncovering the exposure aperture, a blade ring for operating the shutter leaves, the combination of a master member with said trigger, said master member comprising a pair of coaxially arranged drive members, a lost motion connection between said drive members including a striking surface on the first member and a lug positioned to be struck on the second member, a power spring tending to drive the first member in one direction, a latch element on the first member positioned to be engaged by the trigger to hold the shutter in a set position, a latch connecting the second member and the blade ring, means for separating the striking surface and lug in setting the shutter whereby pressure on the trigger may release the first member for movement, the striking surface gaining speed and striking the lug driving the second member to rapidly operate the shutter blades through the blade ring and blade ring latch.

3. In a camera shutter of the type including a casing having an exposure aperture therein, a trigger mounted on the casing, shutter leaves for covering and uncovering the exposure aperture, a blade ring for operating the shutter leaves, the combination of a master member with said trigger, said master member comprising a pair of coaxially arranged drive members, a pin and slot lost motion connection between the coaxially arranged drive members, a blade ring latch connecting the second member and the blade ring, a power spring tending to turn the first member in one direction, a latching lug thereon for engaging the trigger to resist such movement, a setting lever operably connected to the first member, operation of the setting lever moving the first element and when the said pin reaches one end of the slot moving the second member to a set position whereby upon release of the trigger the first member may move rapidly until the pin reaches the opposite end of the slot driving the second element to operate the shutter blades.

4. In a camera shutter of the type including a casing having an exposure aperture therein, a trigger mounted on the casing, shutter leaves for covering and uncovering the exposure aperture, a blade ring for operating the shutter leaves, the combination of a master member with said trigger, said master member comprising a pair of coaxially arranged drive members, a pin and slot lost motion connection between the coaxially arranged drive members, a blade ring latch connecting the second member and the blade ring, a power spring tending to turn the first member in one direction, a latching lug thereon for engaging the trigger to resist such movement, a setting lever operably connected to the first member through a pinion attached to the first member, a rack carried by the setting lever meshing therewith, operation of the setting lever moving the first element and when the said pin reaches one end of the slot moving the second member to a set position whereby upon release of the trigger the first member may move rapidly until the pin reaches the opposite end of the slot driving the second element to operate the shutter blades.

CARL C. FUERST.